(12) United States Patent
Marotzke

(10) Patent No.: US 8,608,194 B2
(45) Date of Patent: Dec. 17, 2013

(54) STEERING WHEEL ASSEMBLY FOR A MOTOR VEHICLE

(75) Inventor: Thomas Marotzke, Bergfelde (DE)

(73) Assignee: Takata-Petri AG, Aschaffenburg (DE)

( * ) Notice: Subject to any disclaimer, the term of this patent is extended or adjusted under 35 U.S.C. 154(b) by 128 days.

(21) Appl. No.: 13/132,874

(22) PCT Filed: Dec. 7, 2009

(86) PCT No.: PCT/EP2009/066532
§ 371 (c)(1), (2), (4) Date: Jun. 3, 2011

(87) PCT Pub. No.: WO2010/063849
PCT Pub. Date: Jun. 10, 2010

(65) Prior Publication Data
US 2011/0233905 A1    Sep. 29, 2011

(30) Foreign Application Priority Data

Dec. 5, 2008  (DE) .......................... 10 2008 060 821
Dec. 5, 2008  (DE) .......................... 20 2008 017 216
Dec. 22, 2008 (DE) .......................... 10 2008 064 581

(51) Int. Cl.
*B60R 21/203* (2006.01)

(52) U.S. Cl.
USPC .......................... 280/731; 280/728.2; 280/750

(58) Field of Classification Search
USPC .......................... 280/728.2, 731, 732, 753, 750
See application file for complete search history.

(56) References Cited

U.S. PATENT DOCUMENTS

| 5,380,037 A | 1/1995 | Worrell et al. |
| 5,507,521 A * | 4/1996 | Steffens, Jr. .................. 280/775 |
| 5,775,725 A | 7/1998 | Hodac et al. |

(Continued)

FOREIGN PATENT DOCUMENTS

| CN | 1695987 A | 11/2005 |
| DE | 195 03 816 A1 | 8/1996 |

(Continued)

OTHER PUBLICATIONS

International Search Report from the International Bureau of WIPO for International Application No. PCT/EP2009/066532 dated Jan. 4, 2010 (3 pages) and an English translation of the same (3 pages).

(Continued)

*Primary Examiner* — Joseph Rocca
*Assistant Examiner* — Timothy Wilhelm
(74) *Attorney, Agent, or Firm* — Fitch, Even, Tabin & Flannery, LLP

(57) ABSTRACT

A steering wheel assembly for a motor vehicle comprising a steering wheel that can be mounted rotatably about a steering axle on a motor vehicle is provided. The steering wheel assembly comprises an airbag module disposed in a predeterminable use position on the steering wheel, and an adjusting device disposed on the steering wheel assembly. Said adjusting device is adapted and provided for adjusting the spatial position of the airbag module relative to the steering wheel for the purposes of compensating for tolerances perpendicular to the steering axle. In the process, the adjusting device comprises adjusting means for generating an adjusting force that has at least one force component along the adjusting direction of the airbag module and also a guide device for guiding the airbag module along the adjustment direction thereof.

15 Claims, 11 Drawing Sheets

(56) References Cited

U.S. PATENT DOCUMENTS

| | | | |
|---|---|---|---|
| 5,871,233 A * | 2/1999 | Tanaka et al. | 280/777 |
| 6,183,011 B1 | 2/2001 | Andronis | |
| 6,437,265 B1 * | 8/2002 | Kreuzer | 200/61.54 |
| 6,675,675 B1 | 1/2004 | Sauer et al. | |
| 6,959,944 B2 * | 11/2005 | Mori et al. | 280/728.2 |
| 7,204,511 B2 * | 4/2007 | Mori et al. | 280/731 |
| 7,398,994 B2 | 7/2008 | Poli et al. | |
| 2001/0035631 A1 | 11/2001 | Hasebe | |
| 2003/0023353 A1 | 1/2003 | Badarneh | |
| 2006/0197323 A1 * | 9/2006 | Pillsbury et al. | 280/731 |
| 2008/0136073 A1 * | 6/2008 | Kreuzer | 267/140.11 |

FOREIGN PATENT DOCUMENTS

| | | |
|---|---|---|
| DE | 197 54 831 A1 | 6/1999 |
| DE | 299 17 214 U1 | 3/2000 |
| DE | 199 27 032 A1 | 12/2000 |
| DE | 20 2004 010 098 U1 | 10/2004 |
| DE | 10 2005 054 459 A1 | 5/2007 |
| DE | 10 2006 005 642 A1 | 8/2007 |
| DE | 10 2006 037 672 A1 | 2/2008 |
| DE | 20 2006 020 353 U1 | 7/2008 |

OTHER PUBLICATIONS

Notification concerning Transmittal of International Preliminary Report on Patentability (Chapter I or Chapter II of the Patent Cooperation Treaty) from the International Bureau of WIPO for International Application No. PCT/EP2009/066532 dated Jun. 16, 2011, 7 pages.

English Translation of Office Action issued in counterpart Chinese Application No. 200980133953.2 dated Oct. 29, 2012 (8 pages).

* cited by examiner

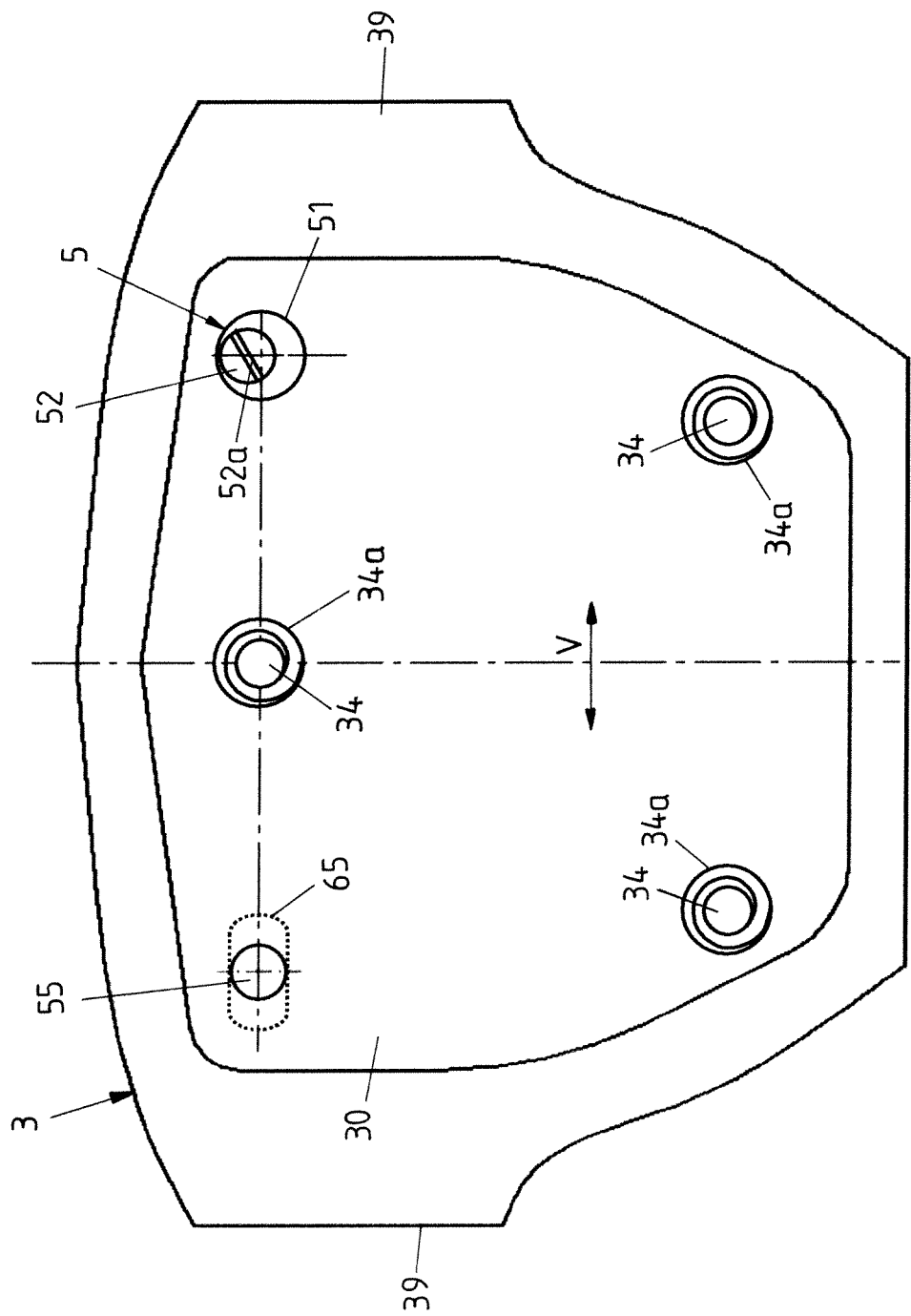

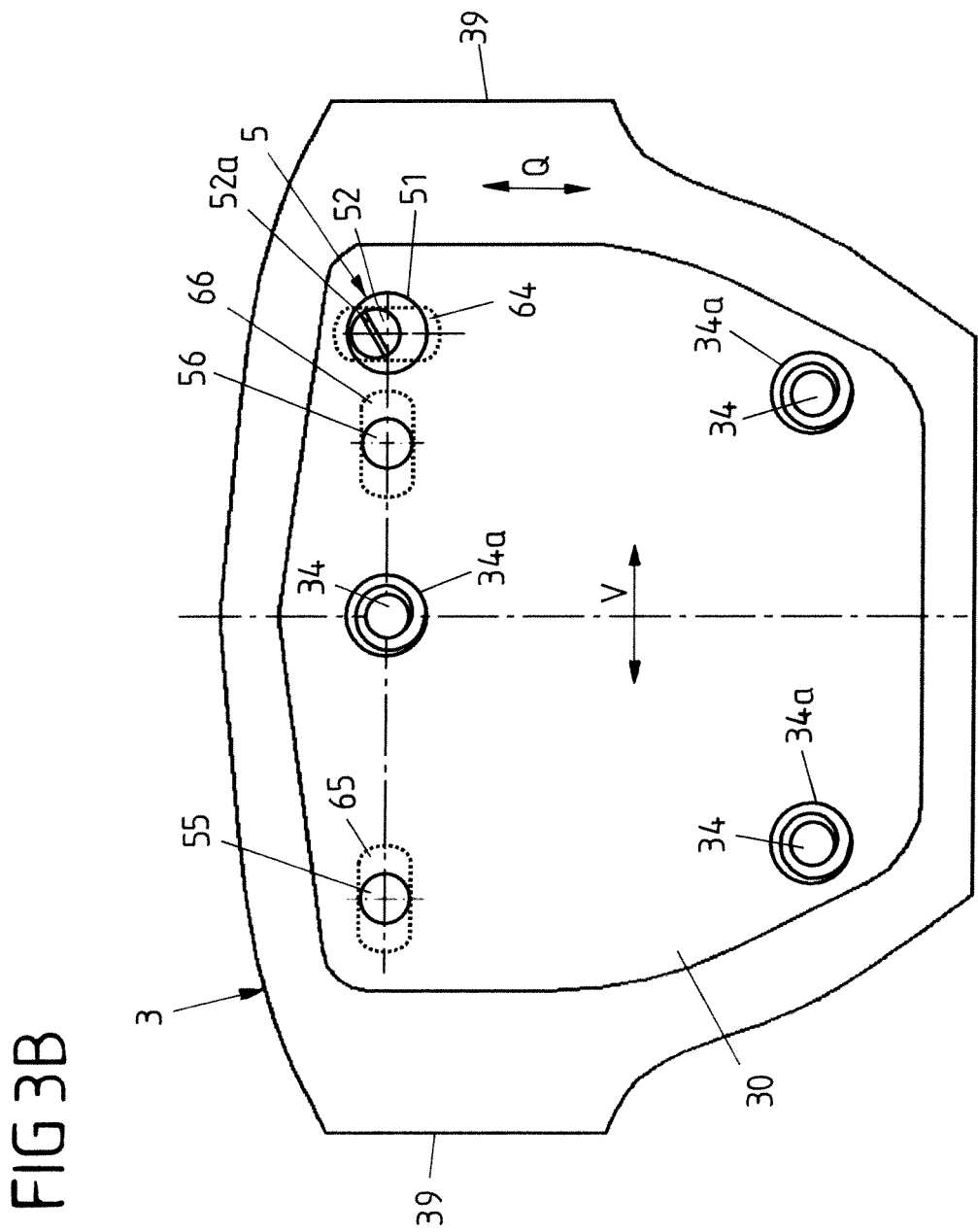

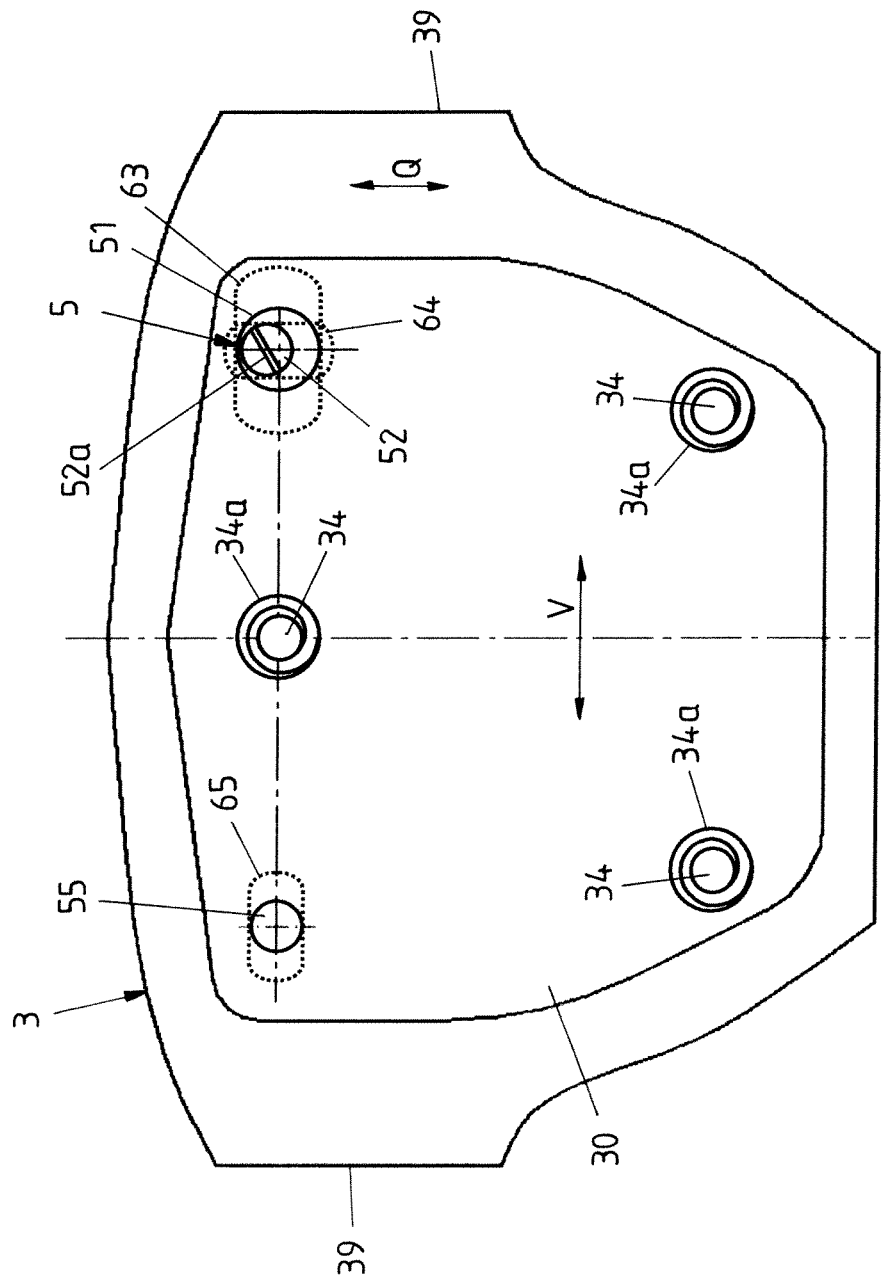

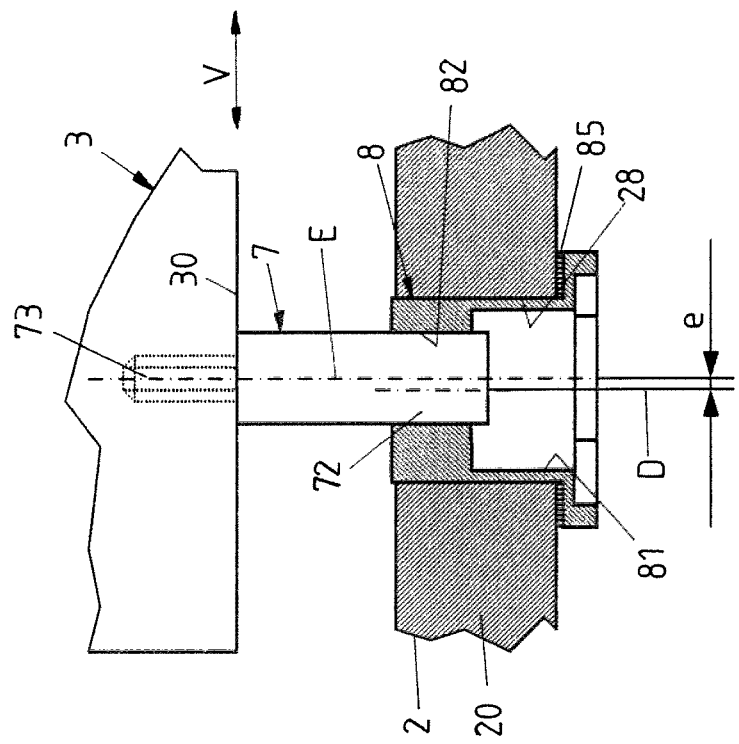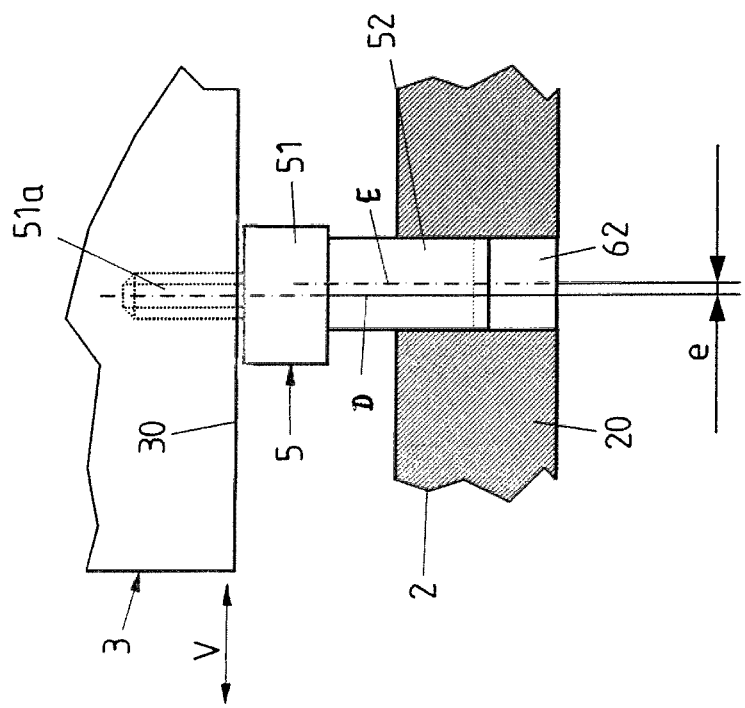

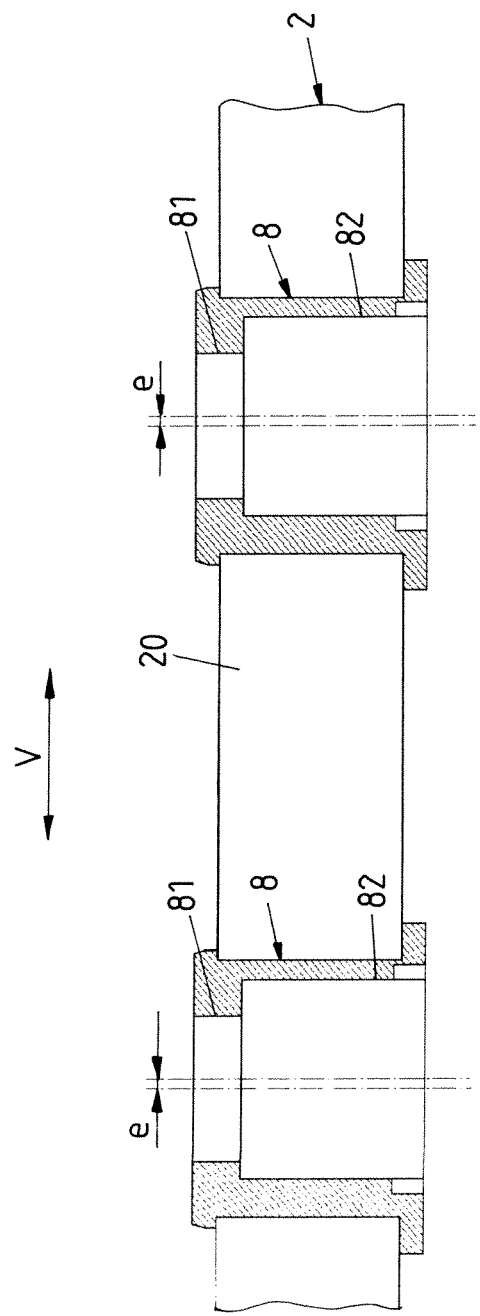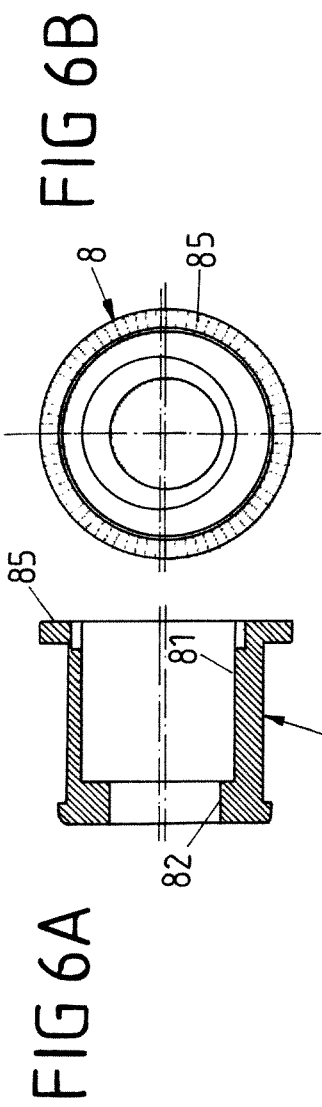

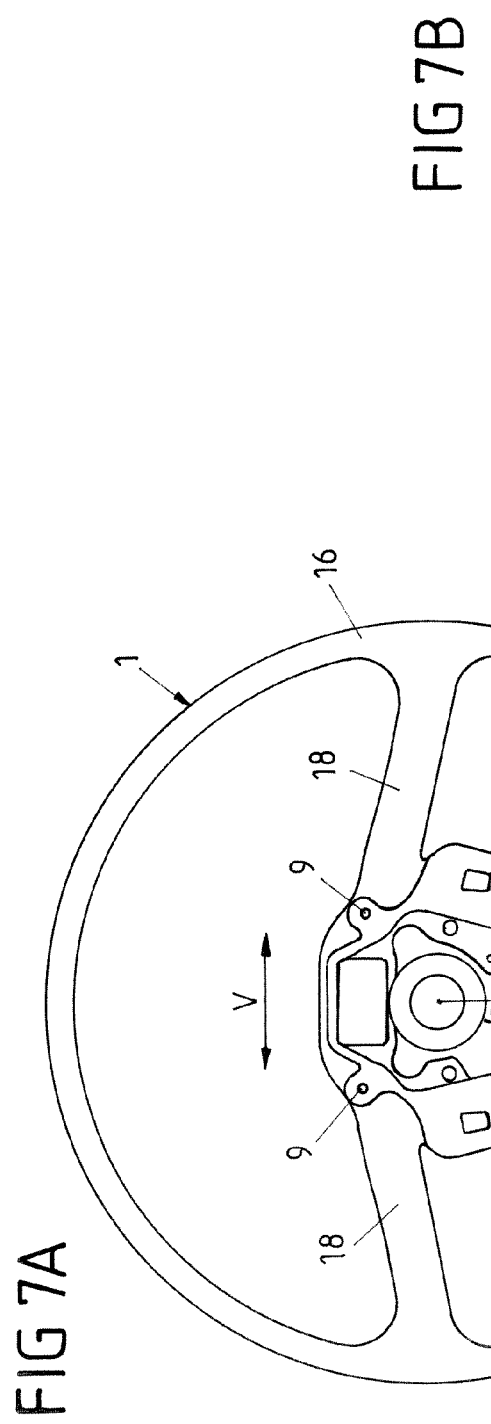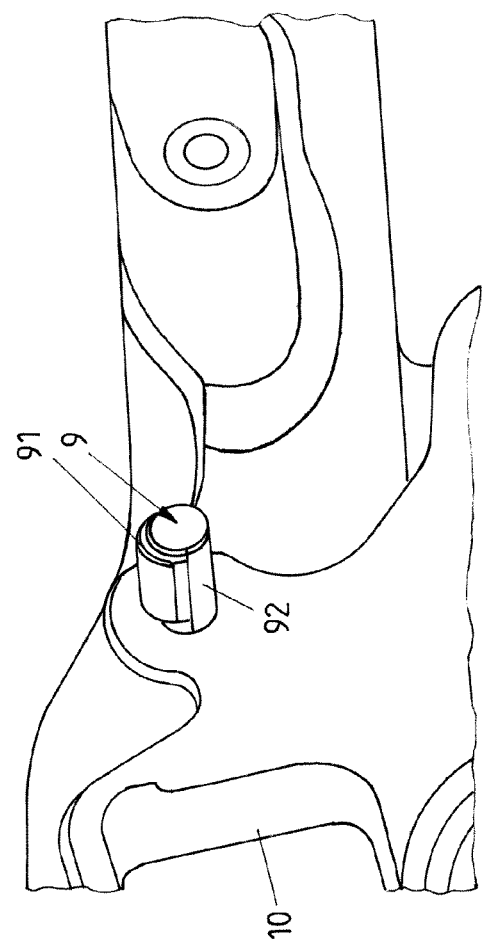

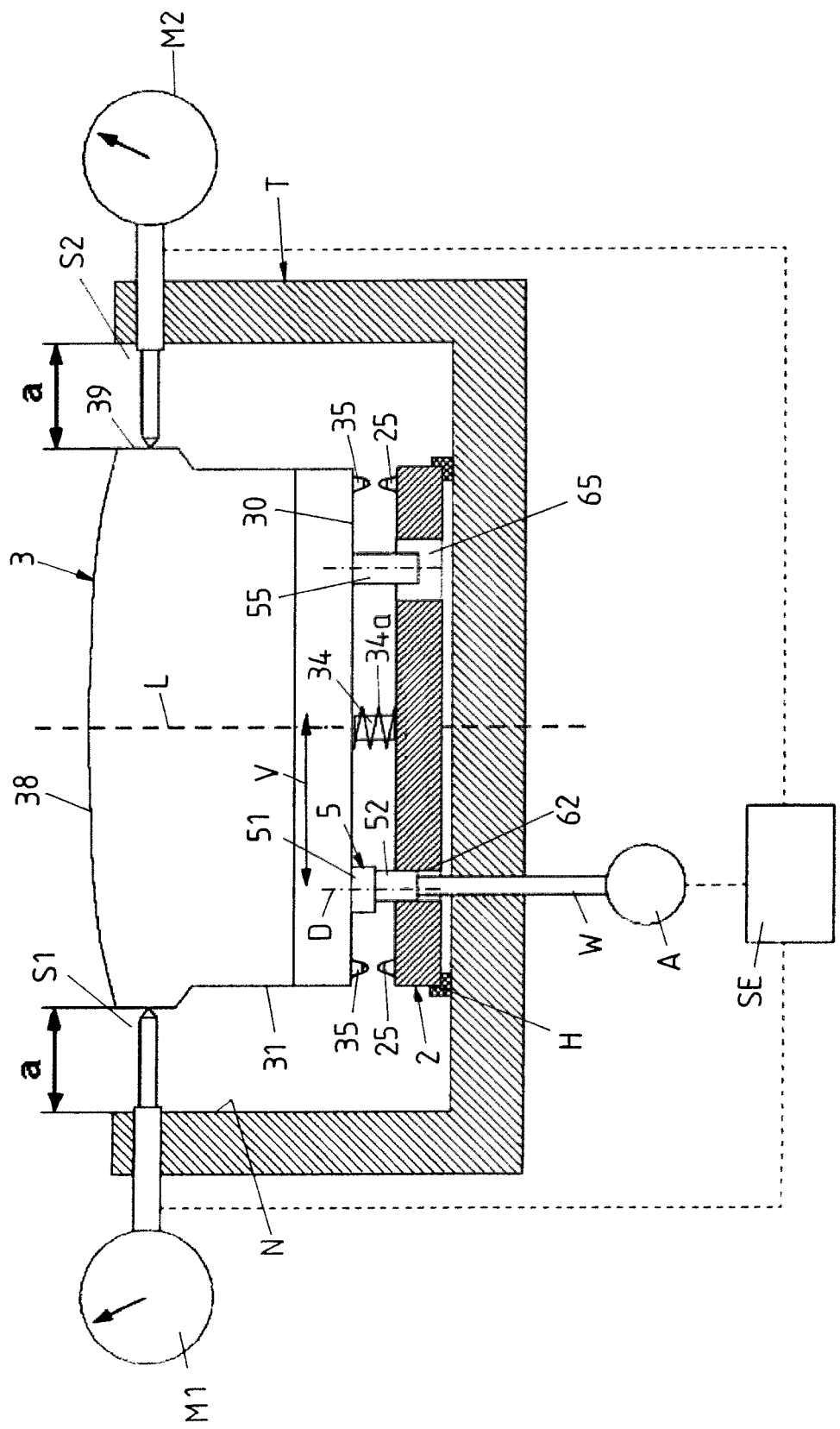

STEERING WHEEL ASSEMBLY FOR A MOTOR VEHICLE

CROSS-REFERENCE TO A RELATED APPLICATION

This application is a National Phase Patent Application of International Patent Application Number PCT/EP2009/066532, filed on Dec. 7, 2009, which claims priority of German Utility Model Application Number 20 2008 017 216.0, filed on Dec. 5, 2008, German Patent Application Number 10 2008 060 821.1, filed on Dec. 5, 2008 and German Patent Application Number 10 2008 064 581.8, filed on Dec. 22, 2008.

FIELD OF THE INVENTION

The invention relates to a steering wheel assembly for motor vehicle.

BACKGROUND

Such a steering wheel assembly comprises a steering wheel that can be mounted rotatably (around a steering axle) on a motor vehicle with at least one functional component in form of an airbag module disposed in a predetermined use position on a steering wheel.

It is known to dispose additional functional components on steering wheels which do not directly serve the steering of the motor vehicle but rather take over additional functions, amongst them an airbag module that serves the protection of a driver of the motor vehicle in the event of a crash and which is further more (optional) provided for activating a honking function of the motor vehicle by acting on the front side of the airbag module facing the driver by (manual) exerting pressure.

In case of an airbag module disposed on the steering wheel it can be suitable or even necessary to separate that airbag module from further areas of the steering wheel by at least one (optionally circumferential) gap in order to achieve specific design effects and/or to allow for a desired movement of the airbag module doing its operation—for instance in case of the mentioned honking function, a movement of the airbag module along the steering wheel by impact of the vehicle passenger via the hand whereby a gap revolving on the outer edge of the airbag module allows simultaneously also a certain tilting of the airbag module (as consequence of an unsymmetrical forced transmission).

In case of such a steering wheel assembly, it is important to positioning the airbag module disposed thereon correctly in a predetermined use position on the steering wheel, for instance so that the gap dimensions of the gap separating the airbag module from the steering wheel reach their predetermined values.

SUMMARY

The object of the invention is to provide a steering wheel assembly of the previously mentioned kind allowing a reliable, exact positioning of the assigned functional component on the steering wheel.

According to an exemplary embodiment of the invention an adjustment device is disposed on the steering wheel assembly being adapted and provided for adjusting the spatial position of the airbag module relative to the steering wheel perpendicular to the steering axle L, thus in particular along a plain continuing lateral along to the steering axle in order to compensate for tolerances during the positioning of the airbag module on the steering wheel and therefore to position the airbag module precisely in its use position.

The use position is such a position of a functional component, here an airbag module, on the steering wheel which said functional component is supposed to take after intended assembly into a steering wheel and is supposed to keep it, thus here the intended assembly position of an airbag module in a central area of a steering wheel.

In the present case the adjusting device comprises adjusting means by means of which an adjusting force can be generated which has at least one force component along the adjusting direction of the airbag module, and further more a guiding device, with which the airbag module can be guided along its adjusting direction.

For a defined disposition of the airbag module on the steering wheel a corresponding receptacle, for instance in form of a recess, can be provided on said steering wheel.

The adjusting device assigned to the airbag module can thereby be designed and provided for adjusting a gap continuing along the plain extending vertical to the steering axle between the edge of said recess and the airbag module, for instance a revolving gap. The adjustment can occur in particular for the purpose that the width of two sections of a gap opposing each other is not becoming too large.

The airbag module can have a carrier element which carries components (sub-components) of the airbag module.

For adjusting the airbag module (perpendicular to the steering axle) the adjusting device can have an excentric component (for instance an excentric pin) protruding from a (carrier) element of the airbag module or from another component of the steering wheel assembly, in particular from a steering wheel hub or a contact bridge, which engages with a (free) end to an opening of a component of the steering wheel assembly deviating from said (carrier) element or the said other components of the steering wheel assembly so that the airbag module is adjusted by rotating the excentric component (excentric pin) relatively to said components of the steering wheel assembly. For this reason an excentric pin can engage in particular form fit into the corresponding opening, which can for this reason also be designed as a slot.

The excentric component will be in the following designated shortly as excentric.

According to an exemplary embodiment the excentric (excentric pin) has a central section (excentric body) and an excentric section protruding and being shifted thereto, which are guided in the said component of the steering wheel assembly in each case in an own plain whereby the two plains continue parallel to each other. Hereby, an opening, for instance in form of a slot, respectively, can be provided in each of the two plains for guiding the central section and the excentric section of the excentric (excentric pin) protruding thereof. The longitudinal axle of the two slots can thereby in particular continue crosswise to each other.

According to a further exemplary embodiment, the adjusting device has for adjusting the airbag module at least one pin protruding from a (carrier) element of the airbag module or from another component of the steering wheel assembly which engages with a (free) end into an excentric socket of a component of the steering wheel assembly deviating from said (carrier) element or said component of a steering wheel assembly, so that the airbag module can be adjusted during rotation of the excentric socket in respect to said part of the steering wheel assembly.

Furthermore, a guiding element (guiding pin) can protrude for forming a guiding device from a (carrier) element of the airbag module or from another component of the steering wheel assembly, which engages for instance (with a free end) in a guiding connecting manner (for instance a slot) of a component deviating from the (carrier) element or the other component of the steering wheel assembly.

The last mentioned component of the steering wheel assembly can be formed for instance by a steering wheel hub (as a component of the steering wheel assembly deviating from the carrier element) or by a contact bridge (as a component of the steering wheel assembly deviating from the steering wheel hub).

The guiding device defines a guiding path by means of which a movement (in extending direction of the guiding path) is enforced onto the airbag module while operating the adjusting means, whereby the guiding device comprises in particular additional to the adjusting means intended components.

Furthermore, locking means can also be assigned to the adjusting device with which the adjusting device can be locked in a respective adjusting position, for instance for providing the locking means for locking of a rotational position of an excentric serving as an adjusting means or being designed on a threaded piece of the excentric, in particular by a stiffness or a self-hindering formation of the thread.

In case of the airbag module provided as an adjusting function component of the steering wheel assembly in particular an airbag module can be provided that is movably mounted (along the steering axle) in a limited manner for releasing a honking function.

Furthermore, the arrangement according to the invention can also be used for adjusting or positioning a control element of the steering wheel, as for instance a switch or button, or a design element of the steering wheel, as for instance a panel for covering a steering wheel rim or of steering wheel spokes. In the first mentioned case an adjustment of the control element is not meant to be the adjustment of different control units, as for instance different switch positions of a switch. Rather, the adjustment of a use position of the control element altogether for the purpose of the tolerance adjustment is being meant. The adjustment device can also in particular be provided for adjusting the spatial position of multiple functional components provided on the steering wheel assembly (in a plain perpendicular to the steering axle).

BRIEF DESCRIPTION OF THE DRAWINGS

Further details and advantages of the invention are becoming apparent in the following description of embodiments by means of the figures.

FIG. 3A shows a view from below of the airbag module of FIG. 2.

FIG. 3B shows a first modification of the view from below of FIG. 3A.

FIG. 3C shows a second modification of the view from below of FIG. 3A.

FIG. 4A shows a detailed illustration of the steering wheel assembly of FIG. 2.

FIG. 4B shows a modification of the detailed illustration of FIG. 4A.

FIG. 5 shows a further embodiment of an adjusting device for adjusting the position of an airbag module lateral to the steering axle.

FIG. 6A shows a singular illustration of an excentric socket of the kind shown in FIG. 4A.

FIG. 6B shows a view from below of the excentric socket of FIG. 6A.

FIG. 7A shows a top view of a motor vehicle steering wheel with two excentric pins as elements of an adjusting device for adjusting the position of an airbag module.

FIG. 7B shows a detail of FIG. 7A in the area of an excentric pin.

FIG. 8 shows a modification of the arrangement of FIG. 2 in which the steering wheel of FIG. 2 is replaced by a testing device.

DETAILED DESCRIPTION

Figure 1A:
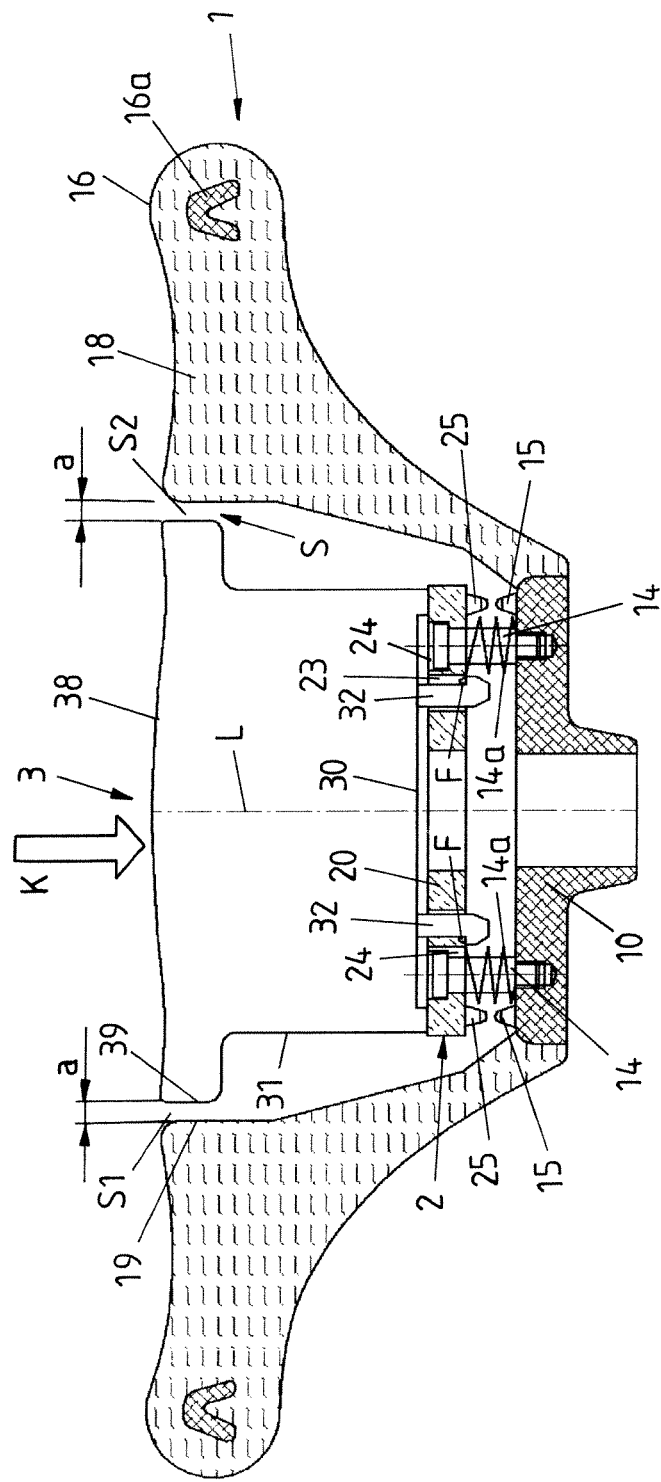
FIG. 1A shows a schematic cross-section of a steering wheel assembly with a honking function being released by the impact onto an airbag module.

FIG. 1A shows a schematic cross section of a motor vehicle steering wheel 1 with a basis formed by steering wheel hub 10 to which an annular revolving steering wheel rim 16 (with rim skeleton 16a) is connected in a known manner via steering wheel spokes 18. The steering wheel hub 10 defines a steering axle L around which the steering wheel is rotatable by intended use by a driver of a motor vehicle and around which the steering wheel rim 16 extends annular.

On the basis of the steering wheel 1 formed by the steering wheel hub 10 a contact bridge 2 is movably rested in a restricted manner along the steering axle L relatively to the steering wheel hub 10 via bolts 14 protruding from the steering wheel hub 10, which engage in a restricted manner movably into the corresponding recesses 24 of the contact bridge 2, and via springing means 14a provided on the bolts 14 (here in form of pressure springs designed as coil spring). Electrical contact elements 25 protrude from the contact bridge 2 or more exactly its basic plate 20 in the direction towards the steering wheel hub 10 to which corresponding electrical contact elements 15 on the steering wheel hub 10 are assigned.

The spring means 14a are selected and preloaded such that they keep the contact bridge 2 or their base plate 20 in state of equilibrium (without additional impact of external forces) along the steering axle L in such a distance from the steering wheel hub 10 so that the electrical contact elements 15, 25 on both sides do not come into abutment with each other, thus no electrical contact occurs between the contact elements 15, 25.

An airbag module 3 is mounted on the contact bridge 2, namely in the embodiment via a snap-in connection, here formed by hooks 32 on the side of the airbag module, which engage into corresponding snap openings 23 of the contact bridge 2 and reach there in a known manner under a contact tongue of the spring element F provided there, respectively, compare U.S. Pat. No. 5,380,037.

The hooks 32 are thereby provided on a carrier element 30 of the lower side of the airbag module 3 facing the steering wheel hub 10 and the contact bridge 2, whereby said airbag module can be for instance formed by a generator carrier for an inflating device of the airbag module.

The airbag module 3 comprises furthermore a housing 31 in which in a known manner an inflatable airbag for the protection of a vehicle passenger, here of a driver of the motor vehicle, and optionally a corresponding inflating device are to be housed in. The housing bottom can thereby also be formed by the carrier element 30 from which if needed a revolving lateral housing wall protrudes and opposing of said carrier element a cover defining the housing upper side 38 is provided. On the front side of the steering wheel facing the driver a gap S is formed between a (revolving) upper lateral edge section 39 of the airbag module 3, which faces away from the steering wheel hub 10 and the contact bridge 2, and the inner edge section 19 of the steering wheel spokes 18 pointing towards the airbag module 3, whereby in each case a gap section S1, S2 is located between in each case one of the spokes 18 of the steering wheel and the opposing upper edge section 39 of the airbag module 3.

This gap S or the gap sections S1, S2 by which the airbag module 3 is distanced in the area of its upper outer edge 39 from the spokes 18 or more exactly their inner edge section 19, allow for a longitudinal movement of the airbag module 3 relative to the steering wheel 1 along the steering axle L.

The longitudinal movement of the airbag module 3 relative to the steering wheel 1 results from the fact that the airbag module 3 is fixed via the previously described snap-in connection 23, 32, F to the contact bridge 2, which in turn is mounted (along the steering axle L) on the steering wheel 1 or more exactly its hub 10 in a restricted axial slidable manner.

If a force K is exerted onto the airbag module 3 in the area of its upper side 38 along the steering axle L, in particular by a hand of a driver handling the steering wheel 1, the spring means 14a acting between the contact bridge 2 fixed to the airbag module 3 and the steering wheel hub 10 are compressed—opposite to their elastic preload—by the action of this force K, so that the contact bridge 2 moves along the steering axle L towards the steering wheel hub 10 and the electrical contact elements 15, 25 on both sides engage in electrical contact with each other. Through this, a signal horn of the motor vehicle is being electrically operated (honking function), compare DE 10 2004 010 098.

In order to guarantee the herefore required axial movability of the airbag module 3 together with the contact bridge 2 along the steering axle L by exertion of an external force K, a sufficient transverse dimension A (width) of the mentioned gap S between airbag module 3 and steering wheel 1 is required. In concrete, the gap dimensions of said gap S or their single gap sections S1, S2 have to be dimensioned such that they allow also a minor tilting of the airbag module 3 by exerting a force K for conducting the honking function, which can for instance occur when the force K is not being applied centrally but rather excentric of the upper side 38 of the airbag module 3.

Figure 1B:
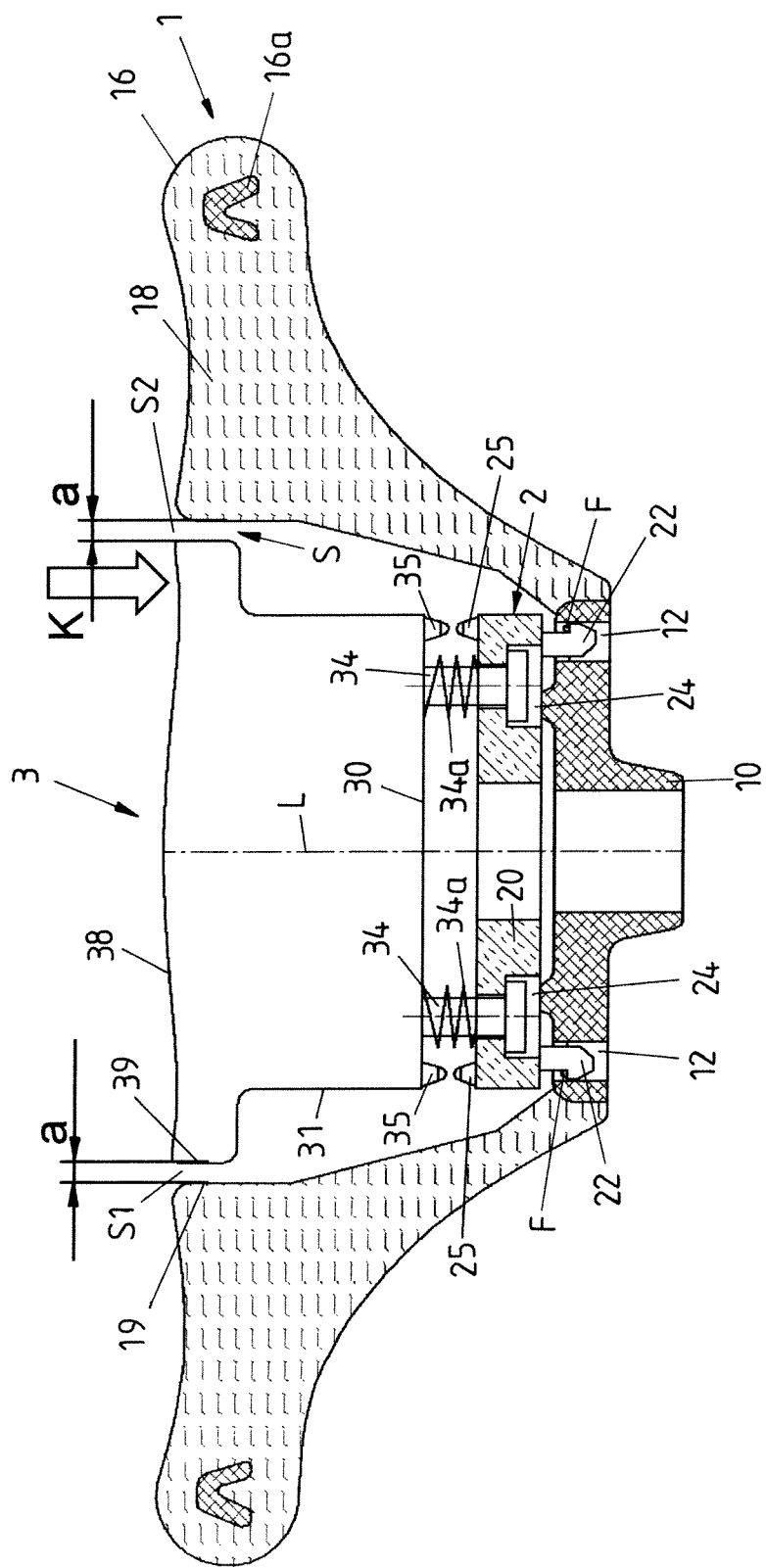
FIG. 1B shows a first modification of the steering wheel assembly of FIG. 1A.

FIG. 1B shows a modification of the steering wheel assembly of FIG. 1A in respect to the arrangement of the electrical contact elements 25, 35 for triggering a signal horn. In the embodiment of FIG. 1B they are arranged on one hand on the contact bridge 2, namely on the side facing towards the airbag module 3, and on the other hand on the airbag module 3, namely on its lower side or more exactly on the carrier element 30 facing towards the contact bridge 2; and the airbag module 3 is mounted by the means of bolts 34 protruding from its lower side, which engage along the steering axle L restricted slidably into assigned recesses 24 of the contact bridge 2, and (preloaded) elastic spring means 34a arranged on the bolts 34 along the steering axle L relatively to the contact bridge 2 slidably on latter one. This one is in turn fixed via a snap-in connection, in the present case formed by the snap hooks 22 on the side of the contact bridge and snap recesses 12 on the side of the steering wheel hub and assigned leg springs F on the steering wheel 1, more exactly on their hub 10.

For triggering the honking function a movement of the airbag module 3 relative to the contact bridge 2 fixed to the steering wheel 1 occurs along the steering axle L here by the impact of an external force K, whereby the electrical contact elements 35 on the side of the module come into abutment with the contact elements 25 on the side of the contact bridges by deformation of the spring means 34a.

Figure 1C:
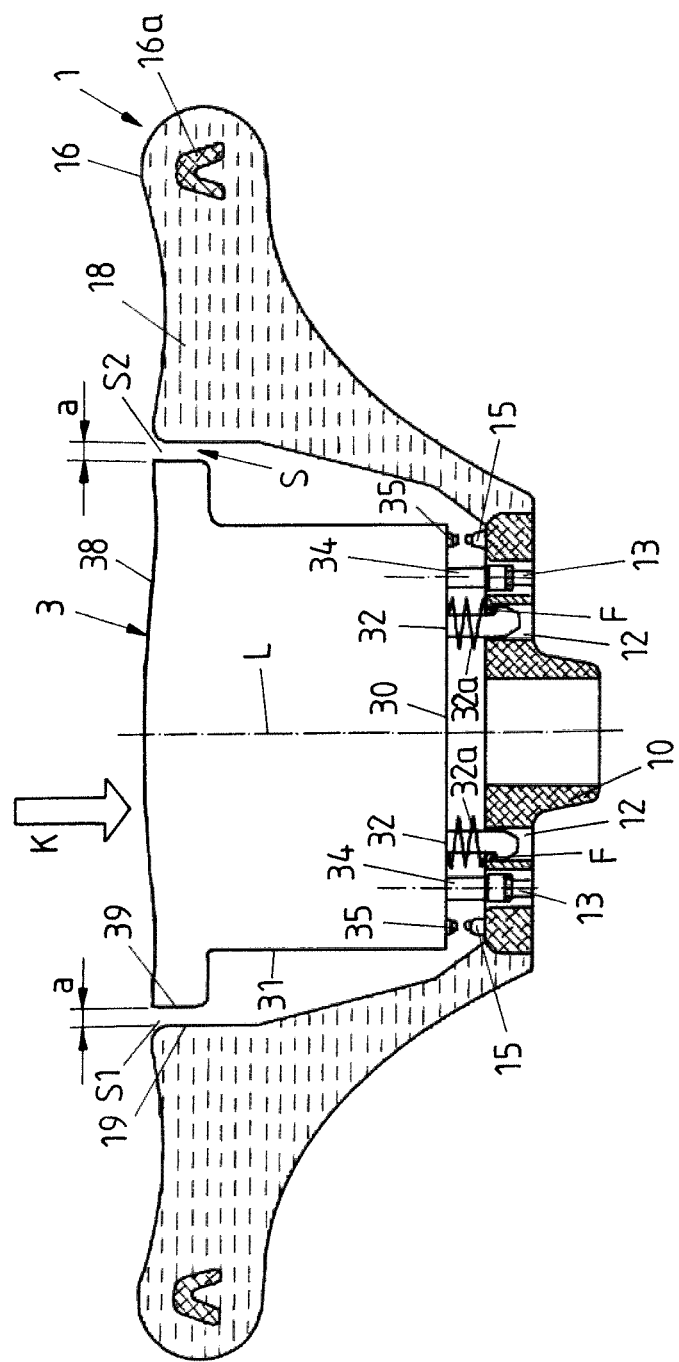
FIG. 1C shows a second modification of the steering wheel assembly of FIG. 1A.

In the embodiment of FIG. 1C an airbag module 3 is mounted along the steering axle L in a slidable manner next to the body of a steering wheel 1, more exactly, its steering wheel hub 10; and there is no separate contact bridge between airbag module 3 and steering wheel hub 10 provided, compare DE 195 03 816 A1.

For this reason, elastic spring means 32a are arranged on the snap hooks 42 via which the airbag module 3 engages into the assigned snap recesses 12 of the steering wheel hub 1, which allow for a restricted axial movement of the airbag module 3 relative to the steering wheel hub 10 by compressing the spring means 32a, whereby the respective snap hook 32 is moved along the steering axle L in its respective assigned snap recess 12. Additional pilot pins can protrude from the lower side of the airbag module 3 for guiding this longitudinal movement, whereby said pins are inserted into assigned guiding openings 13 of the steering wheel hub 10.

In this case the electrical contact elements 15, 35 provided for triggering the honking function are provided on one hand on the steering wheel hub 10 and on the other hand on the lower side of the airbag module 3; and they engage with each other in electrical contact by exerting a force K onto the upper side 38 of the airbag module 3, which leads to a movement of the airbag module 3 towards the steering wheel hub 10 (by compressing the elastic spring means 32a).

In case of the embodiments of the steering wheel assemblies explained by the means of the FIGS. 1A to 1C the dimensions of the gap S or their gap sections S1, S2 are between the lateral upper edge 39 of the airbag module 3 and the assigned inner edge section 19 of the respective steering wheel spoke 18, thus the gap dimension A of the gap S between airbag module 3 and steering wheel 1, are typically in the area of about 1.5 mm.

In respect to the visibility of said gap S for a driver sitting in front of the corresponding steering wheel 1, it is aspired to keep the difference between the gap dimensions of different gap sections S1, S2 of the gap S as low as possible, for instance that gap sections S1, S2 of the kind shown in the FIGS. 1A, 1C opposing each other is clearly lower than 1 mm, for instance maximal 0.4 mm.

Herefore, it is required to assemble the airbag module 3 by considering unavoidable component and assembly tolerances into its use position or position on the steering wheel 1 shown in the FIG. 1A to 1C or more exact to arrange in a (central) receptacle of the steering wheel 1 so that the resulting steering wheel assembly complies with the described requirements regarding gap dimensions.

For this reason, adjusting means are provided according to FIG. 2 on a steering wheel assembly of the kind shown in FIG. 1B and explained in the following in detail.

Figure 2:
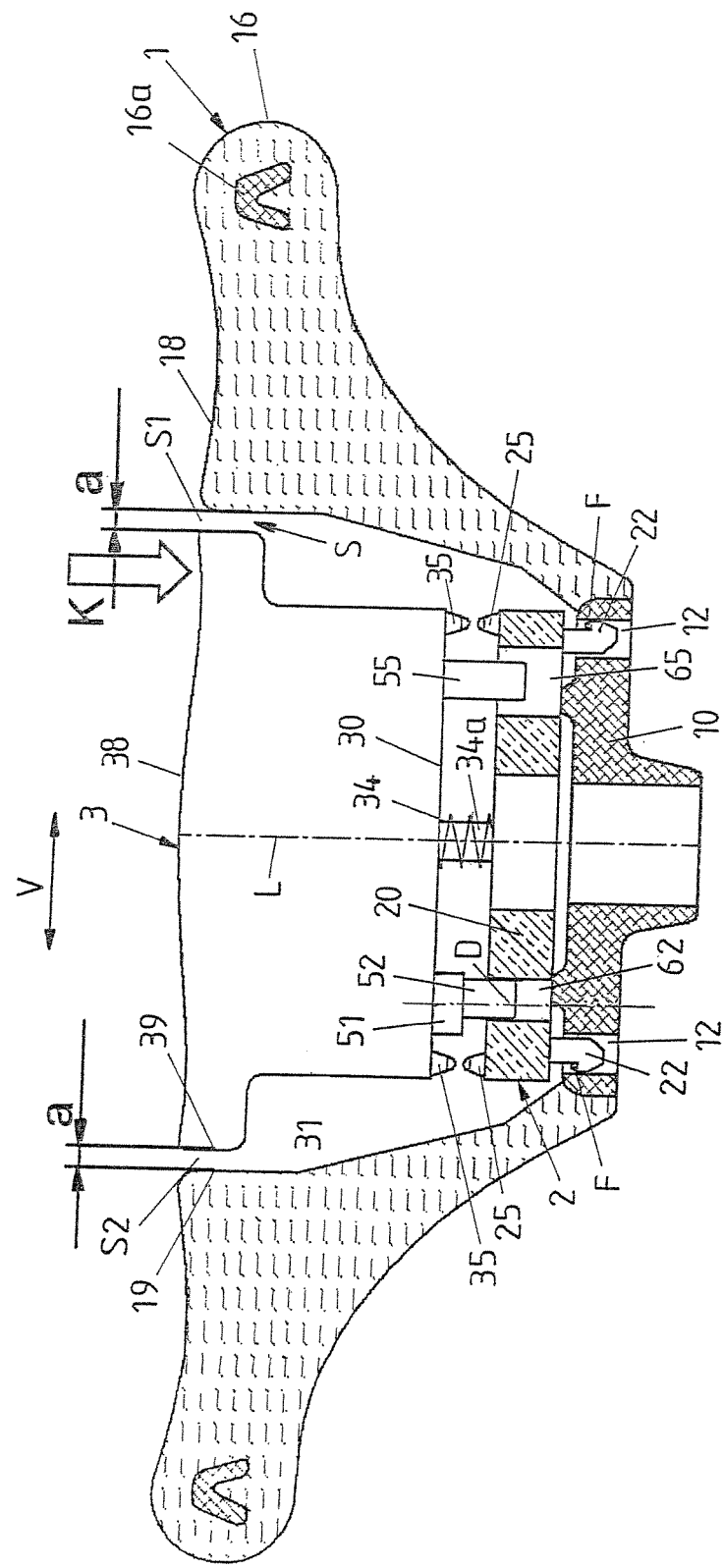
FIG. 2 shows a steering wheel assembly according to FIG. 1B with an adjusting device for adjusting the position of the airbag module lateral to the steering axis.

More specific, an adjusting device 5, 6 is assigned to the steering wheel assembly of FIG. 2 by means of which the airbag module 3 is adjustable (adjustable or positionable) in its use position perpendicular to the steering axle L, at present in particular along a plain continuing lateral to the steering axle L, relative to the steering wheel 1 in order to be able to adjust the gap dimension of the gap sections S1, S2 opposing each other in the use position of the airbag module selectively. Herewith, it should be achieved by compensation of components and mounting related tolerances that the two each other opposing gap sections S1, S2 of the gap S have in the intended arrangement of the airbag module 3 in its use position on the steering wheel 1 the same dimension a, thus in each case the same distance between steering wheel 1 and airbag module 3, more specific between the inner end section 19 of a respective steering wheels spoke 18 and the assigned section of the upper outer edge 39 of the airbag module 3.

The adjusting device 5, 6 comprises in the present case an adjusting means 51, 52, 62 for generating an adjusting moment or a directed moving force for adjusting the airbag module 3 and on the other hand adjusting means 55, 65 for a defined guiding of the airbag module 3 doing an adjustment.

The adjusting means can in general be formed by any element with which a defined movement of the airbag module 3 relative to the steering wheel 1 perpendicular to the steering axle L can be generated, thus for instance by means of (lateral to the steering axle L extending) adjusting screws via which the airbag module 3 interacts with the steering wheel 1; by sliders which can be locked in different adjusting positions; by a suitable gear and so on.

In the present case the adjusting means are formed by a (rotatably mounted) eccentric components 51, 52—subsequently in short designated as eccentric—, which protrudes from a lower side of the airbag module 3, more exact from a carrier element 30 (generator carrier) provided on the lower side 3 on the airbag module and which has an eccentric body 51 and a guiding part in form of a guiding pin 52 (compare also FIG. 4A) protruding thereof, which is relative to the eccentric body 51 eccentrically arranged in a shifted manner. The rotation axle D of the eccentrics 51, 52 continues thereby (as the guiding pin 52) parallel to the steering axle L and extends centrally in respect to the eccentric body 51, which can therefore be rotated around the rotation axle D, if mounted with an assigned thread bolt 51A in a inner thread on the side of the carrier element. The eccentricity e defined by the difference between the rotation axle D and the middle axle E of the guiding pin 52, compare FIG. 4A, is thereby directed vertically to the steering axle L. Such an eccentric consisting of an eccentrics body 51 and a pin 52 eccentrically arranged thereto is also designated as an eccentric pin.

The eccentrics 51, 52 engages with it's guiding pin 52 in a assigned receiving opening 62 (here in form of a whole) of the contact bridge 2, which compasses with the guiding pin 52 with a low play corresponding to the function without preventing a rotational movement of the eccentrics 51, 52 around the rotational axle D and a downwards and slight tilting movement doing triggering of the honking function.

If the eccentrics 51, 52 is being rotated around its rotation axle D after the assembly of the airbag module 3 into the steering wheel 1 accordingly and if thereby also the guiding pin 52 is rotated around its—relatively to the rotation axle D shifted—central axle E in the receiving opening 62, a relative movement of the airbag module 3 in respect to the contact bridge 2 and therefore also in respect to the steering wheel 1 is thereby triggered—due to the interaction of the eccentric body 51 with the carrier elements 30 of the airbag module 3, on which the contact bridge 2 is fixed via a snap in connection 12, 22, F.

By means of a guiding device 55, 65, here formed by a guiding element 55 protruding from the airbag module or more exact its lower side and a guiding connecting manner 65 (slot) on the side of the contact bridges extending along the desired adjustment direction V with which the guiding element 55 engages, a precise movement lateral to the steering axle L along the connecting distance between the two gap sections S1, S2 is thereby imposed onto the airbag module 3.

Herewith, the airbag module 3 can be adjusted along a adjustment direction V lateral to the steering axle L relative to the steering wheel 1 such that the two each other opposing gap sections S1, S2 have in the use position of the airbag module 3 on the steering wheel 1 (within pre-set, still admissible deviations) the same lateral extension A (width), thus the same distance between steering wheel 1 and airbag module 3 exists on both gap sections S1, S2, respectively. (The dimension of the lateral movement is thereby in particular smaller or equal to the constructively determined play by the mounting of the guiding pins 34).

For the operation of the eccentrics 51, 52 so that it carries out a rotational movement around the assigned rotation axle D, a corresponding actuation section 52A is provided on the eccentric 51, 52, for instance in form of a groove on the guiding pin 52, compare FIG. 3A showing a view from below of the airbag module 3, whereby the guiding connecting manner 65 on the contact bridge side is indicated in form of a slot is additionally indicated in a dotted line.

Alternatively or additionally to the adjustment of the airbag module 3 in respect to the steering wheel 1 by means of the adjusting device 5, 6 after the intended assembly of the airbag module 3 into the steering wheel 1 it can be provided that adjusting device 5, 6 is pre-adjusted already before the assembly of the airbag module 3 and steering wheel 1, in particular by using a testing device, as it will be described later by means of FIG. 8.

When relating concretely to the embodiment of the FIGS. 2 and 3A, the eccentrics 51, 52 can be for instance pre-adjusted in a testing device T of the kind shown in FIG. 8, so that the airbag module 3 in respect to a receptacle N of the testing device T is aligned along a direction lateral to the steering axle L in an optimum manner, thus in particular the gap sections S1, S2 discussed here—however here, in respect to the receptacle N of the testing device T and not of a steering wheel—have the same gap dimension a, respectively. In case that after an assembly of a corresponding airbag module into motor vehicle steering wheel that due to tolerance on the steering wheel side the gap sections S1, S2 deviate stronger from each other in their gap dimension as allowed, then an after-adjustment by means of the adjusting device 5, 6 can then be additionally carried out.

FIG. 3B shows in a view from below of the airbag module 3 corresponding to FIG. 3A a modification of the steering wheel assembly of the FIGS. 2 and 3A in this respect that the guiding device with which the airbag module 3 is specifically guided along an adjustment direction V perpendicular to the steering axle L, has two guiding connecting members 65, 66 in form of a slot respectively, on the contact bridge side, with which in each case a guiding element 55, 56 on the airbag module side engages. The two guiding connecting manner 65, 66 extend thereby respectively along the adjustment direction V and are along the same distance in the embodiment.

Due to this double-guidance of the airbag module 3 along the adjusting direction V a tilting of the airbag module 3 around the steering axle L is avoided during the adjusting process.

In order to avoid a redundant determination, the eccentric 51, 52 is guided thereby with its guiding pin 52 on the side of the contact bridge in a receiving opening 64 formed as a slot, which extends lateral to the adjustment direction V on the contact bridge 2. Along the adjustment direction V the guiding pin 52 is on the other hand essentially received in the said receiving opening 64 free of play.

FIG. 3C shows a further modification of the arrangement of FIG. 3A, whereby here the eccentric 51, 52 is mounted with its mounted eccentric body 51 as well as with the (eccentrically shifted) guiding pin 52 protruding there from in each case in a receptacle 63 or 64 formed as a slot, which lay one after another in plains arranged along the steering axle L.

The eccentric body 51 of the eccentric 51, 52 is thereby mounted in a guiding connecting member 63 in form of a slot extending along the adjustment direction V and is housed therein lateral to the adjustment direction V essentially free of play. The guiding pin 52 on the other side as in case of FIG. 3B, is guided in a receiving opening 64 in form of a slot extending lateral to the adjustment direction V and is thereby received along the adjustment direction V a free of play.

Also herewith a tilting of the airbag module 3 around steering axle L, compare FIG. 2, can be avoided during adjustment of the airbag module 3 relatively to the steering wheel 1.

FIG. 4A shows once more in detail the adjusting means 51, 52, 62 of the adjusting device 5, 6 of FIG. 2, whereby furthermore (defining the rotational axle D of the eccentric) threaded part 51a protruding from the eccentric body 51 of the eccentrics 51, 52 is also shown, via which the eccentric 51, 52 is threaded into a (provided with a corresponding internal thread as mating thread) carrier element 30 of the airbag module 3, so that the eccentric 51, 52 can be rotated through screw movement around its rotational axle D.

The maintenance of a specific rotational position of the eccentrics 51, 52 relatively to the rotational axle D can be thereby achieved by for instance a sufficient stiffness of the thread, by a self-locking construction of the thread, by adhesives or by a separate rotational locking.

FIG. 4B shows a modification of the adjusting means of FIG. 4A in the respect that instead of an eccentric protruding from the airbag module 3 an assigned receiver on the side of the contact bridge is designed eccentrically. The adjusting means of the adjusting device 7, 8 shown in FIG. 4B comprise in concrete a pin 72 threaded via a thread section 73 on the airbag module 3 or its carrier element 30 (torque proved) and an assigned eccentric 8 in form of an eccentric socket which has a receiving opening 82 receiving the pin 72 with a low play and therefore in particular rotatable. A section 81 of the eccentric socket aid following axial thereupon in respect to which the receiving opening 82 is arranged eccentrically, is mounted around a (continuing parallel to the steering axle L) rotational axle D rotatable on the contact bridge 2, namely in a bearing opening 28 of the contact bridge 2, so that the eccentricity e shown in FIG. 4B results as a distance between the rotational axle D and the eccentric axle E. This corresponds to the eccentricity e of the arrangement of the FIGS. 2 and 4A.

Due to a rotational movement of the eccentric socket 8 around its rotational axle D is—due to the eccentricity e of the receiving opening 82 thereof relatively to the rotational axle D - via the pin 72 provided in the receiving opening 72 an adjusting movement of the airbag module 3 along the adjustment direction V is releasable—in a corresponding matter as shown in the embodiment by means of FIGS. 2, 3A and 4A.

A specific adjusting position of the eccentric 8 in form of an eccentric socket which corresponds to a specific position of the airbag module 3 along the adjustment direction V and which corresponds with a specific rotational position of the eccentric 8 (in respect to the rotational axle D), can thereby maintained by locking means in form of a toothing. Corresponding locking means (toothing elements) can thereby provided on the eccentric 8 and/or on the contact bridge 2. In respect to the arrangement of the rotation locking 85 on the eccentric 8 in form of an eccentric socket it is additionally pointed out to the FIGS. 6A and 6B.

FIG. 5 shows two eccentric sockets 8 of the kind shown in the FIGS. 4B, 6A and 6B, which are in each case arranged torque proved on a contact bridge 2, for instance pressed into said one. By means of this eccentric socket 8, for instance pin (provided on a steering wheel hub) pins on the side of the steering wheel can interact, which engage in each case into an eccentric socket 8 or more specific in their receiving opening 81. Through this the contact bridge 2 can be adjusted along the adjustment direction V relatively to the steering wheel 1.

Such a solution can be in particular applied in case of a steering wheel assembly of the kind shown in FIG. 1A in which a contact bridge 2 and an airbag module 3 are tightly connected with each other (via a snap-in connection) and are mounted together (along the steering axle L) axial adjustable in a restricted manner in respect to the steering wheel 1 or the steering wheel hub 10. In this case, an adjustment of a position of the airbag module 3 along the adjustment direction V occurs preferably together with the contact bridge 2 so that these two components 2, 3 are adjusted together for adjusting gap dimensions relatively to the steering 1.

In FIG. 7A a steering wheel 1 with a hub 10 and a steering wheel rim 16 connected therewith via spokes 18 on which hub 10 two eccentric 9 better deducible from the detailed illustration of FIG. 7B are provided which are in each case designed as a pin 91 (mounted rotatably around its longitudinal axle) with an eccentric section 92 in form of a cam protruding there from.

Through this by interaction of the receiving openings on the side of the contact bridge, based on the arrangement of the kind shown in FIG. 1A, or by an interaction of the receiving openings on the side of the airbag module, based from an arrangement of a kind without contact bridge shown in FIG. 1C, an adjustment movement of a corresponding airbag module along an adjustment direction V can be triggered vertical to the longitudinal axle L. An assigned guiding device for aligning the adjustment movement along the predetermined adjustment direction V is thereby not shown. Herewith the adjustment of the discussed gap dimensions can be done on the side of the steering wheel as will be described further below. It is thereby not essential for the relative movement of the functional element (for instance of an airbag module) relatively to a steering wheel according to the invention, which of these both building units (steering wheel or airbag module) are actually moved.

Optionally, first adjusting means 5, 7 of the kind shown in FIG. 2 can thereby be provided as well as additionally second adjusting means 9 of the kind shown in the FIGS. 7A and 7B. This means that on one hand an adjusting possibility of the airbag module 3 in respect to the contact bridge 2 can be provided and on the other hand additionally an adjusting possibility of the steering wheel 1 in respect to the contact bridge via the eccentric pins 9 shown in the FIGS. 7A and 7B.

Also the last mentioned eccentric pins 9 can be already pre-adjusted before the assembly of the steering wheel 1 with the corresponding airbag module by aligning the eccentric pins 9 in respect to a testing device, which represents as a module dummy an airbag module to be arranged on the steering wheel 1 so that the desired gap dimensions between the steering wheel 1 and the testing device representing the airbag module are adjusted. After the assembly of steering wheel 1 and airbag module then also optionally after-adjustments can occur if required.

As it became apparent by means of the above described embodiments, an adjustment device for positioning an airbag module relative to a steering wheel, with the aim of compensating of building units and assembly tolerances, in particular to adjust a specific predetermined gap dimension between airbag module and steering wheel, can act between different components of a steering wheel assembly. The adjusting device 5, 6 of the FIGS. 2 to 4A acts between airbag module 3 and contact bridge 2 which in turn is fixed to the steering wheel 1. Adjusting devices of the kind shown in the FIGS. 5, 7A and 7B can on the other side act between steering wheel 1 and contact bridge 2 (to which again the airbag module is fixed) or directly between steering wheel 1 and airbag module 3. It is only crucial that as a result a relative movement of the airbag module 3 in respect to the steering wheel 1 is achieved lateral to the steering axle with the aim, to adjust gap dimensions of at least one gap between airbag module and steering wheel.

Furthermore, the eccentric mechanism for forming an adjusting device of the previously described kind can be accomplished in very different ways, as well as the respective corresponding guiding device for guiding the airbag module along a predetermined adjustment direction; also other mechanisms than an eccentric mechanism for triggering an adjustment movement of the airbag module relatively to a steering wheel can also be used.

Besides, adjusting devices of the previously described kind can also be applied for positioning of other components of the steering wheel assembly of an airbag module with the aim of compensating tolerances and in particular for adjusting of gap dimensions, as for instance a switch unit, a design element and such.

FIG. 8 shows an arrangement which bases on a steering wheel assembly of the FIG. 1B or 2 in respect of the design of the airbag module 3 and the contact bridge 2. This means that airbag module 3 and contact bridge 2 can be moved towards each other in a restricted manner along the steering axle L in order to be able to bring in contact with each other electrical contact elements 25, 35 arranged with each other for triggering a signal horn.

Furthermore, the airbag module 3 according to the arrangement of FIG. 2 is movable in a restricted manner lateral to the steering axle L along an adjustment direction V relatively to the contact bridge 2 in order to be able to compensate by mounting the airbag module 3 in a steering wheel 1 tolerances in view of the optimization of gap dimensions.

The difference to the arrangement of FIG. 2 consists therein that the contact bridge 2 and the airbag module 3 according to FIG. 8 are not received in a steering wheel 1 but rather in a receiver N formed by a testing device T. For this reason, the contact bridge 2 is inserted into a holder H on the bottom side.

In the height of the revolving upper outer edge 39 of the airbag module 3 length measuring instrument M1, M2 are positioned on the testing device T which—on the sections on the upper outer edge 39 of the airbag module 3 opposing after the assembly therefore in the steering wheel 1, compare FIG. 4, under formation of a respective gap area S1, S2 internal edge section 19 of steering wheel spokes 18—measure the distance a between the respective section of the upper outer edge 39 of the airbag module 3 and the opposing internal side of the receiver N.

Furthermore, the testing device T comprises an actuating tool in form of screwing tool W, which can be driven in the embodiment by means of a drive motor A controlled by a control unit SE and which engages on an actuating section 52a, compare FIG. 3A, of the pin 52 of the eccentrics 51, 52 provided on the airbag module 3 in order to actuate (by rotating) said section.Through this the position of the airbag module 3 can be adjusted in the kind described by means of FIGS. 2, 3A and 4A along an adjustment direction V relative to the contact bridge 2 so that the gap areas S1, S2 (which are formed between the sections of the upper outer edge 39 of the airbag module 3 and the internal side of the receiver N opposing each other) have the same gap dimension a (within admissible deviations).

The adjustment of the eccentric 51, 52 obtained herewith corresponds to a defined, centric alignment of the airbag module 3 in the receiver N of the testing device T along the adjustment direction V. With this alignment of the eccentric 51, 52 the airbag module 3 is then assembled into in steering wheel 1 as shown by means of FIG. 2. The tolerances going back to the contact bridge 2 and the airbag module 3 are compensated already at this point by the previous alignment of the airbag module 3 and the testing device T.

After the assembly of the airbag module 3 in a steering wheel 1 a re-adjustment has only then to occur in such cases—by actuating the eccentric 51, 52 by means of a suitable actuating device—in which (due to tolerances on the side of the steering wheel) the gap dimensions a of the relevant gap areas S1, S2, compare FIG. 2, deviate from each other more stronger than admissible according to the specification.

Such an additional correction of the gap dimensions can alternatively also occur via the eccentric pins 9 on the side of the steering wheel, as shown in FIGS. 7A and 7B.

The invention claimed is:

1. A steering wheel assembly for a motor vehicle with
   a steering wheel that can be mounted rotatably about a steering axle on a motor vehicle, and
   an airbag module disposed in a pre-determinable use position on the steering wheel, further comprising an adjusting device disposed on the steering wheel, said adjusting device being adapted and provided for adjusting the spatial position of the airbag module relative to the steering wheel for the purposes of compensating for tolerances perpendicular to the steering axle,
   wherein the adjusting device comprises adjusting means for generating an adjusting force that has at least one force component along an adjusting direction of the airbag module,
   wherein the adjusting device comprises furthermore a guiding device for guiding the airbag module along the adjustment direction thereof, and
   wherein the adjusting device has an eccentric component.

2. The steering wheel assembly according to claim 1, wherein the steering wheel defines a receptacle for the airbag module, wherein the airbag module is disposed on the steering wheel by forming at least one gap between the steering wheel and the airbag module.

3. The steering wheel assembly according to claim 2, wherein the adjusting device is being adapted and provided to adjust the dimension of the gap defined by the gap to a pre-determinable value.

4. The steering wheel assembly according to claim 3, wherein the airbag module is separated from the steering wheel on at least two gap areas being spatially distanced from each other, wherein the adjusting device is designed such that the gap dimensions of the two gap areas are adjusted such that they are brought in correlation to each other.

5. The steering wheel assembly according to claim 1, wherein the adjusting device can be already operated before the positioning of the airbag module on the steering wheel in order to be able to carry out a pre-adjustment of the adjusting device before the positioning of the airbag module on a steering wheel.

6. The steering wheel assembly according to claim 1, wherein the eccentric component has an eccentricity which is directed perpendicular to the steering axle and is rotatably mounted on a rotation axle continuing parallel to the steering axle.

7. The steering wheel assembly according to claim 6, wherein the eccentric component is provided for generating an adjusting force with at least one force component along the adjusting direction of the airbag module by rotating the excentric component around a rotation axle or by resting the eccentric component as a rotatable element.

8. The steering wheel assembly according to claim 7, wherein the eccentric component has an eccentric body via which the eccentric component is rotatably mounted around a rotation axle and a guiding part arranged eccentrically relatively to the rotation axle for generating an adjusting force with a force component along the adjusting direction of the airbag module during a rotational movement of the eccentric component.

9. The steering wheel according to claim 7, wherein the eccentric component has a receiving opening arranged eccentrically relative to its rotation axle in which an element is mounted, via which the adjusting force generated by the eccentric component during a rotational movement can be guided into the airbag module to be adjusted.

10. The steering wheel assembly according to claim 1, wherein the guiding device defines a guiding path along which a movement is imposed onto the airbag module when operating the adjusting means.

11. The steering wheel assembly according to claim 1, wherein the guiding device has at least a guiding connecting member into which an assigned guiding element is inserted along the adjustment direction.

12. The steering wheel assembly according to claim 11, wherein at least two guiding connecting members being distanced from each other are provided.

13. The steering wheel assembly according to claim 1, wherein a locking means is assigned to the adjusting device with which the adjusting device can be locked in a respective setting position.

14. The steering wheel assembly according to claim 13, wherein the locking means are provided for locking a rotational position of the eccentric.

15. The steering wheel assembly according to claim 1, wherein the airbag module is mounted on the steering wheel via a contact bridge, wherein the airbag module is adjustable along the adjustment direction together with the contact bridge or relatively to the contact bridge.

* * * * *